3,017,264
PROCESS FOR DESENSITIZING ZIRCONIUM FOR USE IN PRIMERS
Peter Karlowicz, 4411 Higbee St., Philadelphia, Pa.
No Drawing. Filed July 28, 1959, Ser. No. 830,159
5 Claims. (Cl. 75—97)
(Granted under Title 35, U.S. Code (1952), sec. 266)

The invention described herein may be manufactured and used by or for the Government for governmental purposes without the payment to me of any royalty thereon.

This invention relates to a process for desensitizing zirconium used in primer mixtures and has for an object to provide a simple and easy process for obtaining zirconium of the desired level of desensitivity to electrostatic discharge, friction, and heat.

The desirability of using small metal particles of zirconium in a primer has been known for probably over two decades. However during this long period there has been a persistent difficulty residing in the dangerous sensitivity of this material to electrostatic discharge or spark igniting prematurely, sometimes with fatalities. Various ways of reducing that sensitivity to a safer level have been sought. Such a safer level has now been found for a discharge of 0.125 joule of electrostatic energy into the material where the same zirconium has been previously found to be likely to be ignited by a far smaller energy discharge.

Under this invention a finely powdered mass of zirconium as an ingredient of primer material having a usual particle size of about 10 to 70 microns and a few percent smaller than 10 microns, heretofore customarily employed in primer material has been found to have a sensitivity to a discharge of 0.000125 joule of electrostatic energy as being sufficient to ignite the material, something considered dangerously sensitive. After treatment by the process of this invention the desensitivity of that zirconium powder has been increased 1000 times to a level of safety such that a discharge of 0.125 joule of electrostatic energy into the material did not ignite it.

Specifically zirconium powder to be desensitized is treated for about 3 to 5 minutes in a solution of 1% by volume of hydrofluoric acid in 99% by volume of distilled water at a room temperature and intimately mixed by stirring with a plastic inert rod with all particles of the powdered mass. Afterward, the acid solution is drawn off, and the wet powdered material is washed with distilled water to remove all parts of said acid. Following this the traces of water are removed with the aid of a volatile solvent such as acetone, and then ethyl ether (preferably chemically pure) and then dried in air.

A still more specific view of this process may be an example as having 20 grams of zirconium powder treated with 150 cubic centimeters of the hydrofluoric acid solution which has been prepared in an acid resistant vessel with a manual or mechanical stirrer inert to the acid. The zirconium metal powder is poured cautiously into an acid containing vessel under a hood to carry off objectionable gases. Stirring insures the desired uniformity and intimacy of contact. After completion of the 3 minute reaction, about 150 cubic centimeters of colder water at about 5° C. or 6° C. is poured into the mixture in the vessel to stop the reaction. The stirring is stopped and the powder allowed to settle for a few minutes after which the supernatant liquid is poured off. The remaining powder is washed well, preferable twice, with warm water at between about 60° C. to 65° C. followed by washing with water at room temperature. The hot water is to remove all traces of the acid, and water at room temperaure is to reduce the temperature of the zirconium to a safe value. From this treatment the moisture is removed by washing twice with enough acetone to cover the powder each time of washing. The reason for his precaution is zirconium powder is more sensitive with moisture in it than when dry. Finally to dry the powdered zirconium of acetone and any moisture in the acetone enough anhydrous ethyl ether is poured over the powder to cover it. The test for sensitivity to electrostatic energy is then made after the anhydrous ethyl ether has evaporated and the powder dried in the oven for 2 hours at 65° C. When no sensitivity test or other tests are required the zirconium powder while covered with water at room temperature may be sent to the primer house for processing or storage.

This treatment results in a zirconium powder able to withstand 0.125 joule of electrostatic energy without ignition, and friction.

The longer the time of the acid treatment, the larger will be the percentage of the zirconium that is dissolved in the acid solution. The minimum time of 3 minutes is used.

No more than 5 minutes of treatment should be needed. This particular strength of the specific acid is believed to be most effective while at the same time exerting a minimum solvent effect upon the zirconium. Weaker solutions of hydrofluoric acid will also produce the same effect with longer time for the reaction.

Among the advantages of this process is the provision of a safe and simple method for converting dangerously sensitive primer component, namely zirconium powder into a zirconium powder having the desired degree of insensitivity to electrostatic spark or friction namely an ability to withstand 0.04 to 0.125 joule of electrostatic energy with safety without ignition.

It has been found that sulfuric acid also produces the same effect but with much longer reaction time and therefore has been discarded in favor of the hydrofluoric acid.

I claim:
1. A process for desensitizing powdered zirconium of a size about 10 to 70 microns comprising the treatment of said material by intimate contact with about a 1% solution of hydrofluoric acid in water at about room temperature for between about 3 to 5 minutes.

2. A process according to claim 1 which is followed by washing the acid out of the powdered zirconium with distilled water.

3. A process according to claim 2 in which the washing is performed at least twice by hot water at a temperature of about 60° C. to 65° C. followed by washing with water at room temperature to reduce the temperature of the powdered zirconium, then washed with a volatile solvent to remove traces of moisture, and finally dried with anhydrous ethyl ether before testing the sensitivity of the zirconium to electrostatic energy.

4. A process for desensitizing primer size powdered zirconium which comprises treating such powdered zirconium with about 1% solution of hydrofluoric acid in water in intimate contact for at least about 3 to 5 minutes.

5. A process according to claim 4 which includes removing traces of acid after such treating and then removing traces of water.

References Cited in the file of this patent

UNITED STATES PATENTS

| | | |
|---|---|---|
| 1,665,635 | Marden | Apr. 10, 1928 |
| 2,537,068 | Lilliendahl et al. | Jan. 9, 1951 |
| 2,740,709 | Herres et al. | Apr. 3, 1956 |